United States Patent
Cunningham et al.

(10) Patent No.: US 6,470,302 B1
(45) Date of Patent: Oct. 22, 2002

(54) INTERFACE DEVICE AND METHOD FOR INTERFACING INSTRUMENTS TO VASCULAR ACCESS SIMULATION SYSTEMS

(75) Inventors: Richard L. Cunningham, Arlington, VA (US); Philip Feldman, Baltimore, MD (US); Ben Feldman, McLean, VA (US); Gregory L. Merril, Chevy Chase, MD (US)

(73) Assignee: Immersion Medical, Inc., Gaithersburg, MD (US)

( * ) Notice: Subject to any disclaimer, the term of this patent is extended or adjusted under 35 U.S.C. 154(b) by 0 days.

(21) Appl. No.: 09/238,559

(22) Filed: Jan. 28, 1999

Related U.S. Application Data

(60) Provisional application No. 60/072,809, filed on Jan. 28, 1998.

(51) Int. Cl.[7] ................................................ G06G 7/48
(52) U.S. Cl. ............................ 703/7; 434/262; 128/897
(58) Field of Search ............... 703/1–12; 434/262–275; 600/425–429; 128/897; 700/159

(56) References Cited

U.S. PATENT DOCUMENTS

| | | |
|---|---|---|
| 3,226,846 A | 1/1966 | Wood ........................ 434/272 |
| 3,304,434 A | 2/1967 | Koster ................... 250/231.14 |

(List continued on next page.)

FOREIGN PATENT DOCUMENTS

| | | |
|---|---|---|
| DE | 3834-553 A | 4/1990 |
| EP | 169-776 A | 1/1986 |

(List continued on next page.)

OTHER PUBLICATIONS

Salisbury et al, "Phantom–Based Haptic Interaction with Virtual Objects", IEEE Computer Graphics and Applications, pp. 6–10 (Oct. 1997).*

Dinsmore et al, "Virtual Reality Training Simulation for Palpation of Subsurface Tumors", IEEE Virtual Reality Annual International Symposium, pp. 54–60 (Mar. 1997).*

(List continued on next page.)

*Primary Examiner*—Russell Frejd
*Assistant Examiner*—Samuel Broda
(74) *Attorney, Agent, or Firm*—Paul M. Thyfault

(57) ABSTRACT

An interface device and method for interfacing instruments to a vascular access simulation system serve to interface peripherals in the form of mock or actual medical instruments to the simulation system to enable simulation of medical procedures. The interface device includes a catheter unit assembly for receiving a catheter needle assembly, and a skin traction mechanism to simulate placing skin in traction or manipulating other anatomical sites for performing a medical procedure. The catheter needle assembly and skin traction mechanism are manipulated by a user during a medical procedure. The catheter unit assembly includes a base, a housing, a bearing assembly and a shaft that receives the catheter needle assembly. The bearing assembly enables translation of the catheter needle assembly, and includes bearings that enable the shaft to translate in accordance with manipulation of the catheter needle assembly. The shaft typically includes an encoder to measure translational motion of a needle of the catheter needle assembly, while the interface device further includes encoders to measure manipulation of the catheter needle assembly in various degrees of freedom (e.g., translation, pitch and yaw) and the skin traction mechanism. Alternatively, the shaft may include an additional encoder to measure translational motion of an instrument inserted through the catheter needle assembly. The simulation system receives measurements from the interface device encoders and updates the simulation and display, while providing control signals to the force feedback device to enable application of force feedback to the catheter needle assembly.

34 Claims, 8 Drawing Sheets

U.S. PATENT DOCUMENTS

| | | | |
|---|---|---|---|
| 3,541,541 A | 11/1970 | Engelbart | 345/164 |
| 3,748,366 A | 7/1973 | Rader et al. | 434/272 |
| 3,775,865 A | 12/1973 | Rowan | 434/262 |
| D233,238 S | 10/1974 | Reid et al. | |
| 4,321,047 A | 3/1982 | Landis | 434/262 |
| 4,360,345 A | 11/1982 | Hon | 434/262 |
| 4,409,479 A | 10/1983 | Sprague et al. | 250/237 G |
| D272,833 S | 2/1984 | Van Assche et al. | |
| 4,459,113 A | 7/1984 | Boscaro Gatti et al. | 434/272 |
| 4,490,810 A | 12/1984 | Hon | 436/43 |
| 4,642,055 A | 2/1987 | Saliterman | 434/268 |
| 4,712,101 A | 12/1987 | Culver | 345/157 |
| 4,726,772 A | 2/1988 | Amplatz | 137/625.17 |
| 4,767,333 A | 8/1988 | Born | 434/262 |
| 4,773,865 A | 9/1988 | Baldwin | 434/268 |
| 4,789,340 A | 12/1988 | Zikria | 434/727 |
| 4,804,328 A | 2/1989 | Barrabee | 434/308 |
| 4,807,158 A | 2/1989 | Blanton et al. | 345/581 |
| 4,867,168 A | 9/1989 | Stoor et al. | 600/416 |
| 4,867,685 A | 9/1989 | Brush et al. | 434/234 |
| 4,879,668 A | 11/1989 | Cline et al. | 345/424 |
| 4,907,973 A | 3/1990 | Hon | 434/262 |
| 4,936,862 A | 6/1990 | Walker et al. | 128/898 |
| 5,044,956 A | 9/1991 | Behensky et al. | 434/45 |
| 5,077,608 A | 12/1991 | Dubner | 348/583 |
| 5,086,401 A | 2/1992 | Glassman et al. | 700/259 |
| 5,099,846 A | 3/1992 | Hardy | 600/407 |
| 5,112,228 A | 5/1992 | Zouras | 434/262 |
| 5,130,794 A | 7/1992 | Ritchey | 348/39 |
| 5,137,458 A | 8/1992 | Ungs et al. | 434/262 |
| 5,149,270 A | 9/1992 | McKeown | 434/262 |
| 5,185,561 A | 2/1993 | Good et al. | 318/432 |
| 5,205,289 A | 4/1993 | Hardy et al. | 600/429 |
| 5,220,260 A | 6/1993 | Schuler | 318/561 |
| 5,222,499 A | 6/1993 | Allen et al. | 600/426 |
| 5,261,404 A | 11/1993 | Mick et al. | 600/425 |
| 5,273,038 A | 12/1993 | Beavin | 600/416 |
| 5,295,694 A | 3/1994 | Levin | 273/447 |
| 5,311,422 A | 5/1994 | Loftin et al. | 703/2 |
| 5,320,326 A | 6/1994 | Ju et al. | 251/149.6 |
| 5,320,537 A | 6/1994 | Watson et al. | 434/272 |
| 5,320,538 A | 6/1994 | Baum | 434/307 R |
| 5,322,441 A | 6/1994 | Lewis et al. | 434/307 R |
| 5,333,106 A | 7/1994 | Lanpher et al. | 600/538 |
| 5,338,198 A | 8/1994 | Wu et al. | 433/213 |
| 5,343,871 A | 9/1994 | Bittman et al. | 600/545 |
| 5,354,202 A | 10/1994 | Moncrief et al. | 434/69 |
| 5,376,007 A | 12/1994 | Zirm | 434/262 |
| 5,377,116 A | 12/1994 | Wayne et al. | 700/175 |
| 5,385,474 A | 1/1995 | Brindle | 434/267 |
| 5,389,865 A | 2/1995 | Jacobus et al. | 318/568.1 |
| 5,391,081 A | 2/1995 | Lampotang et al. | 434/262 |
| 5,403,191 A | 4/1995 | Tuason | 434/262 |
| 5,414,337 A | 5/1995 | Schuler | 318/561 |
| 5,438,529 A | 8/1995 | Rosenberg et al. | 708/131 |
| 5,451,924 A | 9/1995 | Massimino et al. | 340/407.1 |
| 5,454,722 A | 10/1995 | Holland et al. | 174/261 |
| 5,459,382 A | 10/1995 | Jacobus et al. | 318/568.11 |
| 5,482,472 A | 1/1996 | Garoni et al. | 434/272 |
| 5,483,254 A | 1/1996 | Powell | 345/87 |
| 5,483,961 A | 1/1996 | Kelly et al. | 600/429 |
| 5,509,810 A | 4/1996 | Schertz et al. | 434/262 |
| 5,510,832 A | 4/1996 | Garcia | 348/56 |
| 5,513,992 A | 5/1996 | Refait | 434/267 |
| 5,518,406 A | 5/1996 | Waters | 434/267 |
| 5,531,227 A | 7/1996 | Schneider | 600/425 |
| 5,546,943 A | 8/1996 | Gould | 600/425 |
| 5,552,995 A | 9/1996 | Sebastian | 700/97 |
| 5,559,412 A | 9/1996 | Schuler | 318/561 |
| 5,576,727 A | 11/1996 | Rosenberg et al. | 345/179 |
| 5,589,854 A | 12/1996 | Tsai | 345/161 |
| 5,593,306 A | 1/1997 | Kohnke | 434/267 |
| 5,609,485 A | 3/1997 | Bergman et al. | 434/262 |
| 5,623,582 A | 4/1997 | Rosenberg | 700/264 |
| 5,629,594 A | 5/1997 | Jacobus et al. | 318/568.11 |
| 5,666,138 A | 9/1997 | Culver | 345/161 |
| 5,682,886 A | 11/1997 | Delp et al. | 600/407 |
| 5,687,259 A | 11/1997 | Linford | 382/294 |
| 5,691,898 A | 11/1997 | Rosenberg et al. | 700/85 |
| 5,701,140 A | 12/1997 | Rosenberg et al. | 345/156 |
| 5,704,791 A | 1/1998 | Gillio | 434/261 |
| 5,721,566 A | 2/1998 | Rosenberg et al. | 345/161 |
| D392,878 S | 3/1998 | Nordstrom et al. | |
| 5,722,836 A | 3/1998 | Younker | 434/272 |
| 5,724,264 A | 3/1998 | Rosenberg et al. | 702/152 |
| 5,731,804 A | 3/1998 | Rosenberg | 345/156 |
| 5,734,373 A | 3/1998 | Rosenberg et al. | 345/161 |
| 5,739,811 A | 4/1998 | Rosenberg et al. | 345/161 |
| 5,740,802 A | 4/1998 | Nafis et al. | 600/407 |
| 5,742,278 A | 4/1998 | Chen et al. | 345/156 |
| 5,755,577 A | 5/1998 | Gillio | 434/262 |
| 5,766,016 A | 6/1998 | Sinclair et al. | 434/262 |
| 5,767,839 A | 6/1998 | Rosenberg | 345/161 |
| 5,768,134 A | 6/1998 | Swaelens et al. | 700/121 |
| 5,769,640 A | 6/1998 | Jacobus et al. | 434/262 |
| 5,791,908 A | 8/1998 | Gillio | 434/262 |
| 5,800,177 A | 9/1998 | Gillio | 434/262 |
| 5,800,178 A | 9/1998 | Gillio | 434/262 |
| 5,800,179 A | 9/1998 | Bailey | 434/262 |
| 5,805,140 A | 9/1998 | Rosenberg et al. | 345/161 |
| 5,807,115 A | 9/1998 | Hu | 434/272 |
| 5,821,920 A | 10/1998 | Rosenberg et al. | 345/156 |
| 5,825,308 A | 10/1998 | Rosenberg | 341/20 |
| 5,825,841 A | 10/1998 | Linford et al. | 382/294 |
| 5,828,197 A | 10/1998 | Martin et al. | 318/567 |
| 5,853,292 A | 12/1998 | Eggert et al. | 434/262 |
| 5,873,731 A | 2/1999 | Prendergast | 434/262 |
| 5,873,732 A | 2/1999 | Hasson | 434/262 |
| 5,880,976 A | 3/1999 | DiGioia, III et al. | 703/7 |
| 5,882,206 A | 3/1999 | Gillio | 434/262 |
| 5,882,207 A | 3/1999 | Lampotang et al. | 434/268 |
| 5,890,908 A | 4/1999 | Lampotang et al. | 434/268 |
| 5,891,131 A | 4/1999 | Rajan et al. | 606/5 |
| 5,909,380 A | 6/1999 | Dubois et al. | 703/11 |
| 5,941,710 A | 8/1999 | Lampotang et al. | 434/272 |
| 5,945,056 A | 8/1999 | Day et al. | 264/250 |
| 5,947,743 A | 9/1999 | Hasson | 434/262 |
| 5,950,629 A * | 9/1999 | Taylor et al. | 128/897 |
| 5,951,301 A | 9/1999 | Younker | 434/272 |
| 5,956,040 A | 9/1999 | Asano et al. | 345/419 |
| 5,967,790 A | 10/1999 | Strover et al. | 434/274 |
| 5,995,738 A | 11/1999 | DiGioia, III et al. | 703/11 |
| 6,038,488 A * | 3/2000 | Barnes et al. | 700/161 |
| 6,106,301 A | 8/2000 | Merril | 434/262 |

FOREIGN PATENT DOCUMENTS

| | | |
|---|---|---|
| EP | 0 485 766 | 5/1992 |
| EP | 0 800 804 | 10/1997 |
| EP | 0 908 836 | 4/1999 |
| FR | 2 592 514 | 7/1987 |
| SU | 1124-372 A | 11/1984 |
| SU | 1335-994 A | 11/1989 |
| SU | 1732371 A1 | 5/1992 |
| WO | WO 93/08517 | 4/1993 |
| WO | WO 95/02233 | 1/1995 |
| WO | WO 95/02801 | 1/1995 |
| WO | WO 96/16397 | 5/1996 |
| WO | WO 96/2880 | 9/1996 |
| WO | WO 98/10387 | 3/1998 |
| WO | WO 98/58308 | 12/1998 |
| WO | WO 99/25536 | 5/1999 |
| WO | WO 99/38141 | 7/1999 |

OTHER PUBLICATIONS

Gibson et al, "Simulating Arthroscopic Knee Surgery using Volumetric Object Representations, Real–Time Volume Rendering and Haptic Feedback", Technical Report No. TR96–19, Mitsubishi Electric Research Laboratories (Oct. 1996).*

Ginsburg, This Shot Won't Hurt At All, Washington Business, Jul. 6, 1998.

Merril, Virtual and Augmented Reality in Medicine, Proceedings of the IEEE, vol. 86, No. 3, Mar. 1998, pp. 471–473.

Hahn et al., Training Environmental for Inferior Vena Caval Filter Placement, Medicine Meets Virtual Reality, Jan. 1998, pp. 291–296.

Immersion Human Interface Corporation, *Programmer's Technical Reference Manual: Immersion Probe and Personal Digitizer*, May 1994, pp. 1–80.

Kegier, Surgeons Turn to Surgical Simulation Via Virtual Reality to Practice New Procedures, Laproscopy News, Nov. 1994, pp. 6–8.

Merril et al., Cyber Surgery: Cutting Costs, Sewing Benefits, Virtual Reality Special Report, Summer, 1994, pp. 39–42.

Hon, Realistic Medical Simulations, Virtual Reality World, Jul./Aug., 1994, pp. 59–62.

Satava, The Role of Virtual Reality in Medicine of the $21^{st}$ Century, Virtual Reality Systems, vol. 1, No. 2, Fall 1993, pp. 64–67.

Merril et al., Virtual Heart Surgery: Trade Show and Medical Education, Virtual Reality World, Jul./Aug. 1994, pp. 55–57.

Merril et al., Virtual Reality for Tradeshows and Indiviual Physician Training, Virtual Reality Systems, Spring 1994, pp. 40–44.

Rosenberg, Medical Applications of Virtual Reality, Virtual Reality Systems, vol. 1, No. 3, Spring 1994, pp. 48–50.

Merril et al., Surgical Stimulation Using Virtual Reality Technology: Design, Implementation, and Implications, Surgical Technology International III, Fall 1994, pp. 53–60.

Taubes, Surgery in Cyberspace, Discover, Dec. 1994, pp. 85–94.

Krueger et al., The Responsive Workbench, IEEE Computer Graphics and Applications, May, 1994, pp. 12–15.

Jackson et al., Force Feedback and Medical Stimulation, Interactive Technology and the New Paradign for Healthcare, Jan. 1995, pp. 147–151.

Cover et al., Interactively Deformable Models for Surgery Stimulation, IEEE Computer Graphics & Applications, vol. 13, No. 6, Nov. 1993, pp. 68–75.

Okie, Out of Body Medicine, Washington Post, Nov. 5, 1996, pp. 12–14, 17.

Smith, Scanning the Technology, Proceedings of IEEE, vol. 86, No. 3, Mar. 1998, pp. 474–478.

Dawson et al., The Imperative for Medical Simulation, Proceedings of IEEE, vol. 86, No. 3, Mar. 1998, pp. 479–483.

Savata et al., Current and Future Applications of Virtual Reality for Medicine, Proceedings of IEEE, vol. 86, No. 3, Mar. 1998, pp. 484–489.

Bro–Nielsen, Finite Element Modeling in Surgery Stimulation, Proceedings of IEEE, vol. 86, No. 3, Mar. 1998, pp. 490–503.

Ackerman, The Visible Human Project, Proceedings of IEEE, vol. 86, No. 3, Mar. 1998, pp. 504–511.

Delingette, Toward Realistic Soft Tissue Modeling in Medical Simulation, Proceedings of IEEE, vol. 86, No. 3, Mar. 1998, pp. 512–523.

Chen et al., Force Feedback for Surgical Stimulation, Proceedings of IEEE, vol. 86, No. 3, Mar. 1998, pp. 555–568.

Soferman et al., Advanced Graphics Behind Medical Virtual Reality: Evolution of Algorithms, Hardware, and Software Interfaces, Proceedings of IEEE, vol. 86, No. 3, Mar. 1998, pp. 531–554.

Sahidi et al., Clinical Applications of Three Dimensional Rendering of Medical Data Sets, Proceedings of IEEE, vol. 86, No. 3, Mar. 1998, pp. 555–568.

Hill et al., Telepresence Technology in Medicine: Principles and Applications, Proceedings of IEEE, Vol. 86, No. 3, Mar. 1998, pp. 569–580.

* cited by examiner

INTERFACE DEVICE AND METHOD FOR INTERFACING INSTRUMENTS TO VASCULAR ACCESS SIMULATION SYSTEMS

CROSS-REFERENCE TO RELATED APPLICATIONS

This application claims priority from U.S. Provisional Patent Application Ser. No. 60/072,809, filed Jan. 28, 1998 and entitled "Vascular Access Training System and Method". The disclosure in that provisional patent application is incorporated herein by reference in its entirety.

BACKGROUND OF THE INVENTION

1. Technical Field

The present invention pertains to computerized simulation systems, generally of the types disclosed in: International Publication Number WO 96/28800, published Sep. 19, 1996 and entitled "Computer Based Medical Procedure Simulation System"; U.S. patent application Ser. No. 08/923,477, filed Sep. 4, 1997 and entitled "Interventional Radiology Interface Apparatus and Method"; and U.S. Patent Application Docket No. C0136.HTM, filed Jan. 27, 1999 and entitled "Interface Device and Method for Interfacing Instruments to Medical Procedure Simulation Systems". The disclosures of the above-referenced international publication and patent applications are incorporated herein by reference in their entireties. In particular, the present invention pertains to an interface device for interfacing instruments to simulation systems to train medical professionals to access veins for introduction of various fluids into and sampling blood from the accessed veins.

2. Discussion of Related Art

Generally, performance of various medical procedures, such as vascular access procedures, requires great skill to avoid complications that may cause injury to a patient. Medical practitioners typically need to acquire the necessary skill levels and experience to perform these types of procedures in order to ensure successful performance on patients. Although practicing medical procedures on live patients provides excellent training, a procedure may usually only be performed a limited number of times on a particular live patient, and may require the presence of a skilled practitioner to supervise and oversee the procedure to avoid injury to the patient. Further, training medical professionals in medical procedures on live patients requires the use of proper facilities and equipment (e.g., hospital facilities and equipment), thereby incurring substantial costs and limiting procedure practice to a particular time and location.

The prior art has attempted to overcome the above described disadvantages of utilizing live patients to train physicians or other medical professionals to perform various medical procedures by employing simulation techniques. In particular, U.S. Pat. No. 4,907,973 (Hon) discloses an expert system simulator for modeling realistic internal environments. The simulator may be utilized to simulate an endoscopic procedure, whereby a mock endoscope is inserted and manipulated within a model. The model includes a mock bodily region of interest and a plurality of sensors to detect the position of the endoscope. A computer receives signals from the sensors, and retrieves data from memory in accordance with those signals representing the view observed from the measured endoscope position during a real operation. The data is subsequently shown on a video display, whereby the displayed image is adjusted based on movement of the endoscope within the model. Alternatively, the simulator may be used to simulate an angioplasty-balloon operation, whereby a mock catheter is inserted and manipulated within an internal arterial modeling device. The internal arterial modeling device may include mock arterial paths with sensors to track the progress of the inserted catheter within those paths. A computer retrieves and processes data from storage based on sensor data received from the internal sensors, and sends the processed data to a display that provides a visual display simulating a realistic environment (e.g., a view of the catheter within an arterial network).

U.S. Pat. No. 4,642,055 (Saliterman) discloses a hemodynamic monitoring training system that allows medical professionals to obtain substantial experience in hemodynamic monitoring (e.g., placement of a catheter passed from a distant vein through the heart to the pulmonary vasculature for purposes of measuring intracardiac, pulmonary artery and wedge pressures to determine the type or extent of cardiopulmonary disease, to evaluate therapeutic measures and to monitor cardiac function). The system includes a trainer, computer, display, keyboard and mouse and simulates the catheterization process. A catheter having a balloon disposed at its distal end is inserted within a trainer manikin at a catheter insertion point. The balloon is typically inflated to assist the catheter tip through the heart, and may be inflated in the pulmonary artery to measure wedge pressure. The manikin includes tubes representing veins extending internally from the insertion points, and a position sensor that measures advancement of the catheter tip past the sensor. The sensor data enables the computer to determine the location of the catheter tip within a corresponding actual human body based on catheter manipulation within the trainer manikin. The computer receives signals from the trainer and may provide on the display a simulated fluoroscope image showing simulated movement of the catheter through the heart and vasculature.

The Hon and Saliterman systems suffer from several disadvantages. Specifically, these systems utilize a physical model, thereby restricting training of a medical procedure to a particular bodily region or arterial paths defined by that model. Further, use of physical models degrades realism of the simulation and reduces the benefits of simulation training since the models usually do not contain substantially the same complex anatomy as an actual body, and permit a physician or other medical professional to become accustomed to performing a procedure on the same model anatomy. Performance of the procedure on another bodily region or through different arterial paths within the Hon and Saliterman systems typically requires a new model or substantial modifications to an existing model, thereby limiting flexibility of the systems and increasing system costs. Moreover, the Saliterman system does not provide computer-controlled force feedback to an instrument, thereby degrading realism of the simulation and reducing the benefits of simulation training. In other words, the Saliterman system does not provide a computer simulated feel of forces applied to an instrument during an actual medical procedure.

In order to overcome the disadvantages of utilizing physical models described above, medical procedure simulation systems employ virtual reality technology to simulate performance of a medical procedure on a virtual bodily region of interest. Various types of interface devices are typically utilized by these systems to enable a user to interact with the simulation system. In addition, the interface devices may provide force feedback to the user to simulate the forces encountered during an actual medical procedure. For example, International Publication Number WO 95/02233

(Jacobus et al) discloses a medical procedure simulation system that utilizes virtual reality technology and force feedback to provide an accurate simulation of endoscopic medical procedures. The system includes a display device, sound device, graphics/image processing engine and storage module and programmable tactile/force reflecting mechanisms (e.g., disposed within an interface device) that provide force feedback to generate the "feel" of medical instruments and the interaction of the instruments with an anatomical simulation. Force feedback is typically accomplished by a tactile/force reflecting mechanism via a four axis device that imparts forces and torques to a user's hands through a member representative of a medical instrument in response to manipulation of that member. The forces and torques are applied to the user's hands based on the position of the member in relation to characteristics of a geometric model of an organ or virtual reality simulation of a medical procedure environment. The forces and torques are typically generated by four servomotors that manipulate the member to provide a realistic feel during simulation.

U.S. Pat. No. 5,623,582 (Rosenberg) discloses a human/computer interface tool, typically for use with virtual reality simulation systems. The interface tool preferably interfaces a substantially cylindrical object, such as a shaft of a surgeon's tool, to a simulation system computer such that the computer may generate signals to provide a virtual reality simulation with force feedback applied to the object. The interface tool includes a gimbal mechanism, having two degrees of freedom, coupled to a support, and preferably three electromechanical transducers. The object, when engaged by the gimbal mechanism, may move with three degrees of freedom within a spherical coordinate space, whereby each transducer is associated with and senses a respective degree of freedom of motion of the object. A fourth transducer may be utilized by the interface tool to measure rotation of the object about an axis. Alternatively, the interface tool may accommodate catheter insertion virtual reality systems, typically utilizing catheters having two degrees of freedom of motion, whereby the interface tool includes two transducers that are associated with and sense translation and rotation of a catheter, respectively. The transducers of the interface tool may include actuators to impart a force upon the object to provide force feedback to a user.

U.S. Pat. No. 5,821,920 (Rosenberg et al) discloses an apparatus for interfacing an elongated flexible object with an electrical system including an object receiving portion and a rotation transducer. The rotation transducer determines rotational motion of an elongated object when the object is engaged with the object receiving portion and provides an electrochemical interface between the object and electrical system. The rotation transducer may further include an actuator and translational transducer to further provide a translation electrochemical interface between the object and electrical system. A tandem configuration may be utilized for accommodating a device having an external shaft and an elongated flexible object. This configuration includes first and second object receiving portions that respectively accommodate the external shaft and elongated object. The first and second object receiving portions each have an actuator and translation transducer, whereby a rotation transducer is rotatably coupled to the second object receiving portion. In another embodiment, an object receiving portion may be part of a gimbal apparatus. The transducers of the interface device may be implemented as input transducers for sensing motion, or output transducers for imparting forces onto the elongated object.

U.S. Pat. No. 5,704,791 (Gillio) discloses a virtual surgery system that enables simulation of a surgical procedure using image data of a patient and devices simulating the physical instruments a surgeon utilizes in an actual procedure. Image data, corresponding to a portion of an anatomy in a three dimensional data set, is stored in a memory of a computer, whereby a user input device is used to move through the image data, while the image data is viewed on a display. A virtual surgery may be simulated based on the image data and manipulation of the input device. Further, force feedback may be provided based on physical constraint models or edge and collision detection between a virtual tool and walls or edges of the image data. Moreover, the virtual simulator may be utilized to record data of an actual surgical procedure, or as a remote telesurgery device. In addition, a surgical simulator user input device of the system includes a first virtual scope device attached to an end-portion of a hose that extends into and through a first virtual orifice and a box device. The first virtual orifice is attached at a top portion of the box device and accommodates the hose, while the box device includes an arrangement that handles and may further apply force feedback to the hose. A second instrument is attached to a shaft that extends through a second virtual orifice defined in the first virtual scope device. Signals from the first virtual scope device, the second instrument and/or the first and second virtual orifices are provided to the computer to enable simulation of a surgical procedure.

The virtual reality systems described above suffer from several disadvantages. In particular, the virtual reality systems typically interface instruments to simulate a medical procedure. However, these systems do not provide a manner in which to simulate manipulation and preparation of an anatomical site where the procedure is performed, thereby limiting simulation and training to a portion of the medical procedure. Further, the instruments interfacing the virtual reality systems typically extend into an interface device force reflective mechanism (e.g., having actuators), or extend through an interface device and interface numerous components, thereby possibly causing the instrument translational motion to be jerky or inconsistent during manipulation. In addition, the Jacobus and Rosenberg (U.S. Pat. No. 5,623,582) systems generally employ a plurality of actuators to provide force feedback to a single instrument, thereby increasing system complexity and cost.

Another computer interface device for surgical simulation systems includes the Immersion PROBE produced by Immersion Corporation of Palo Alto, California. This interface device includes a pen-like stylus supported on a lightweight mechanical linkage having six degrees of freedom, and reports the position and orientation of the stylus to a computer via a serial port interface. Sensors are disposed at the linkage joints and send spatial coordinates (i.e., X, Y, Z) and orientation (i.e., roll, pitch, yaw) of the stylus to the computer. However, this interface device does not resemble a common medical instrument and does not provide a manner to apply computer controlled force feedback to the interface device, thereby degrading realism of a simulation and reducing benefits of simulation training.

OBJECTS AND SUMMARY OF THE INVENTION

Accordingly, it is an object of the present invention to enhance realism within a medical procedure simulation system by interfacing various peripherals in the form of mock medical instruments to the medical procedure simulation system via an interface device to enable realistic simulation of various aspects of a medical procedure.

It is another object of the present invention to facilitate simulation of vascular access procedures via an interface device to provide realistic training of these procedures to medical practitioners.

Yet another object of the present invention to provide enhanced training of a medical procedure to medical practitioners by enabling the medical practitioner to simulate manipulation and preparation of an anatomical site where the procedure is performed.

Still another object of the present invention is to enhance realism within a medical procedure simulation system and to provide enhanced training of a medical procedure to practitioners by interfacing plural vascular access instruments (e.g., needle and catheter assembly) to the medical procedure simulation system via an interface device to enable realistic simulation of a vascular access and/or catheterization procedure.

A further object of the present invention is to interface instruments to a medical procedure simulation system via an interface device that enables smooth motion of, and application of force feedback to, an instrument during a simulated procedure.

The aforesaid objects are achieved individually and in combination, and it is not intended that the present invention be construed as requiring two or more of the objects to be combined unless expressly required by the claims attached hereto.

According to the present invention, an interface device and method for interfacing instruments to a vascular access simulation system, typically including a computer system and display, serve to interface peripherals in the form of mock or actual medical instruments to the simulation system to enable simulation of medical procedures. The interface device includes a catheter unit assembly for receiving a catheter needle assembly, and a skin traction mechanism to simulate manipulation of an anatomical site. The catheter needle assembly and skin traction mechanism are manipulated by a user during a medical procedure. The catheter unit assembly includes a base, a housing, a bearing assembly and a shaft that receives the catheter needle assembly. The housing is rotatably coupled to the base, while the bearing assembly is rotatably coupled to the housing, thereby enabling manipulation of the catheter needle assembly in two degrees of freedom (e.g., yaw and pitch, respectively). The bearing assembly enables translation of the catheter needle assembly, and includes bearings that enable the shaft to translate in accordance with manipulation of the catheter needle assembly. The shaft is coupled to a tension member that extends between the shaft proximal and distal ends, and about a pulley disposed between those ends. The tension member and pulley arrangement enables smooth motion of the catheter needle assembly. A force feedback device may be utilized to impede pulley rotation and apply force feedback to the catheter needle assembly.

The shaft typically includes an encoder to measure translational motion of a needle of the catheter needle assembly. Alternatively, the shaft may include an additional encoder to measure translational motion of an instrument inserted into the interface device through the catheter needle assembly. In addition, the interface device includes encoders to measure manipulation of the catheter needle assembly in various degrees of freedom (e.g., translation, pitch and yaw).

The skin traction mechanism is utilized to simulate placing skin in traction or manipulating other anatomical sites for performing a medical procedure. The mechanism includes a belt disposed about and extending partially between first and second pulleys, whereby the belt is spring-biased to oppose manipulation by a user. An encoder disposed proximate the first pulley is utilized to measure manipulation of the mechanism.

The simulation system receives measurements from the interface device encoders and updates the simulation and display to reflect catheter needle assembly and/or anatomical site manipulation. The simulation system further provides control signals to the force feedback device to enable application of force feedback to the catheter needle assembly.

The above and still further objects, features and advantages of the present invention will become apparent upon consideration of the following detailed description of specific embodiments thereof, particularly when taken in conjunction with the accompanying drawings wherein like reference numerals in the various FIGS. are utilized to designate like components.

BRIEF DESCRIPTION OF THE DRAWINGS

FIG. 5b is a side view in elevation and partial section of an alternative embodiment of the catheter unit assembly of FIG. 5a.

DESCRIPTION OF THE PREFERRED EMBODIMENTS

Figure 1:
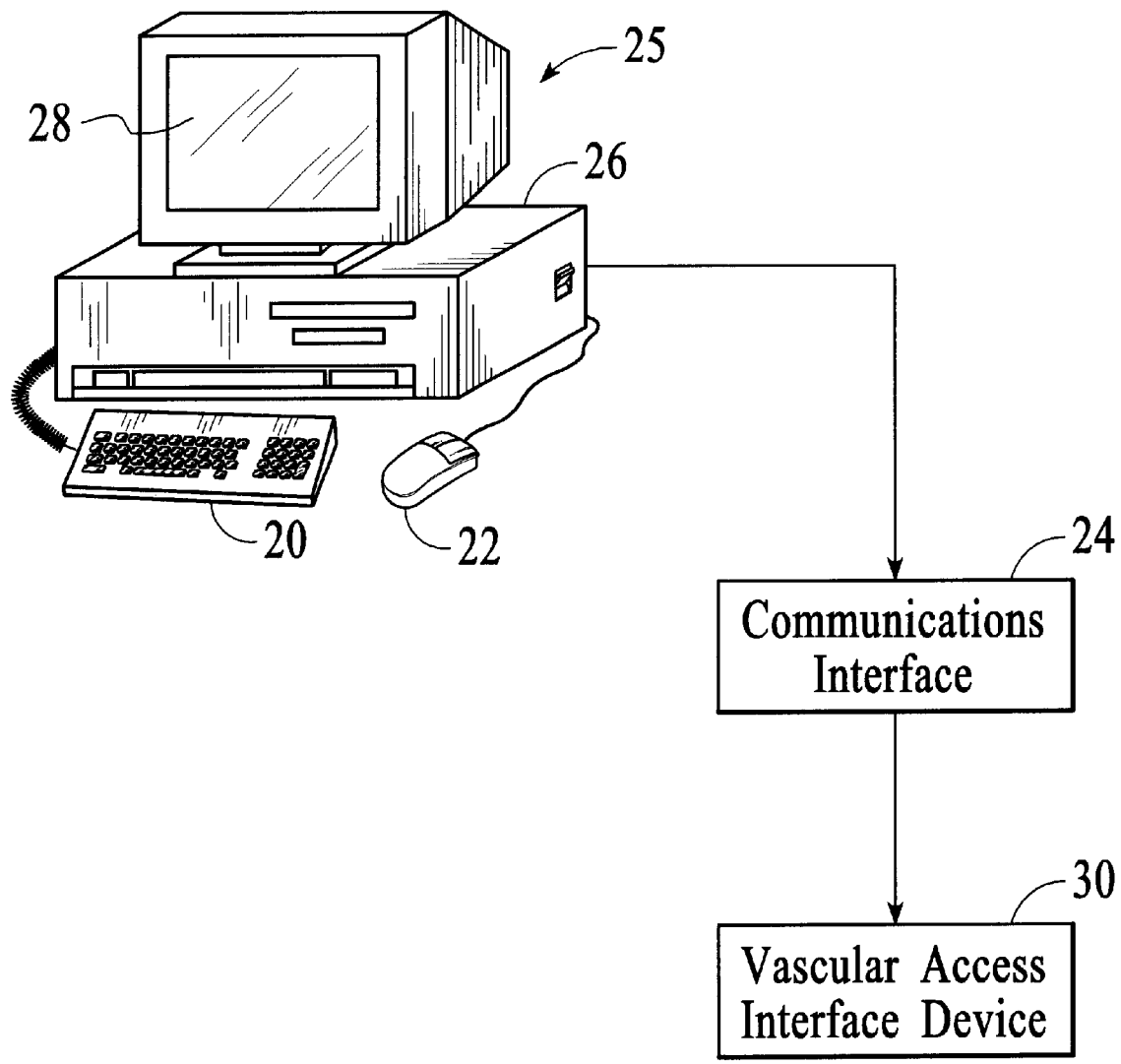
FIG. 1 is a block diagram of a vascular access training system including an interface device according to the present invention.
Figure 2:
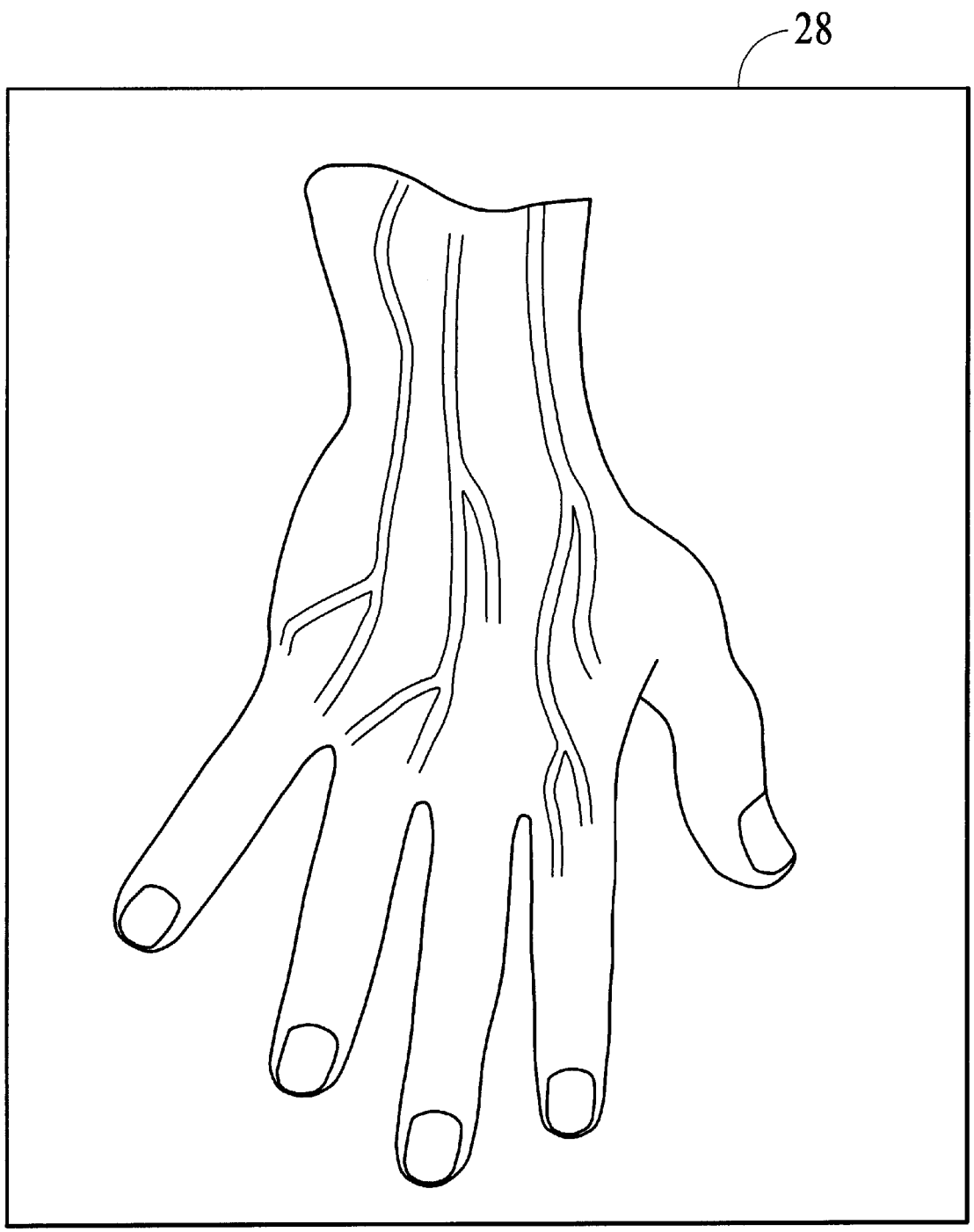
FIG. 2 is a schematic illustration of an exemplary display for the vascular access training system of FIG. 1.

A vascular access training system for training medical professionals to access veins is illustrated in FIGS. 1–2. The vascular access training system trains medical professionals to access veins in hospital and/or clinical settings for introduction of fluids into and sampling blood from the accessed veins. Basically, the vascular access training system may be utilized to train medical professionals to perform various techniques, such as peripheral vascular access, intravenous catheterization, peripherally inserted central catheter placement and central venous catheterization. Specifically, the vascular access training system includes a computer system 25, an interface device 30 and communications interface 24 for transferring signals between computer system 25 and interface device 30. Computer system 25 includes a monitor 28, base 26 (e.g., including processor(s), memories and accompanying hardware), keyboard 20 and mouse 22, and is typically implemented by a conventional or commercially available workstation, such as those manufactured by IBM, Dell or Silicon Graphics, Inc. A medical professional interacts with interface device 30, while observing the effects of the interaction on display 28. An exemplary display of the vascular access training system showing veins on the back of a hand is illustrated in FIG. 2. Computer system 25 processes signals received from interface device 30, via communications interface 24, to adjust display 28 based on the interaction with the interface device. Communications interface 24 includes a processor or other circuitry to sample signals from interface device 30 and transmit those signals to computer system 25. The computer system performs a simulation of the surface and subsurface anatomy of human skin, whereby positioning information of the various instruments (e.g., catheters and needles) utilized by interface device 30 is sampled at least once per update cycle. Computer system 25 determines the effects of instrument motion on the simulated human anatomy based on the positioning information. Anatomical models are deformed or otherwise adjusted to reflect needle and/or catheter motion with simulated results displayed by computer system 25 on monitor 28. In addition, resistive or reactive forces encountered by a medical professional during an actual procedure are imparted to the interface device instruments, via a force feedback mechanism, to enable the simulation to have a realistic feel as described below.

Figure 3:
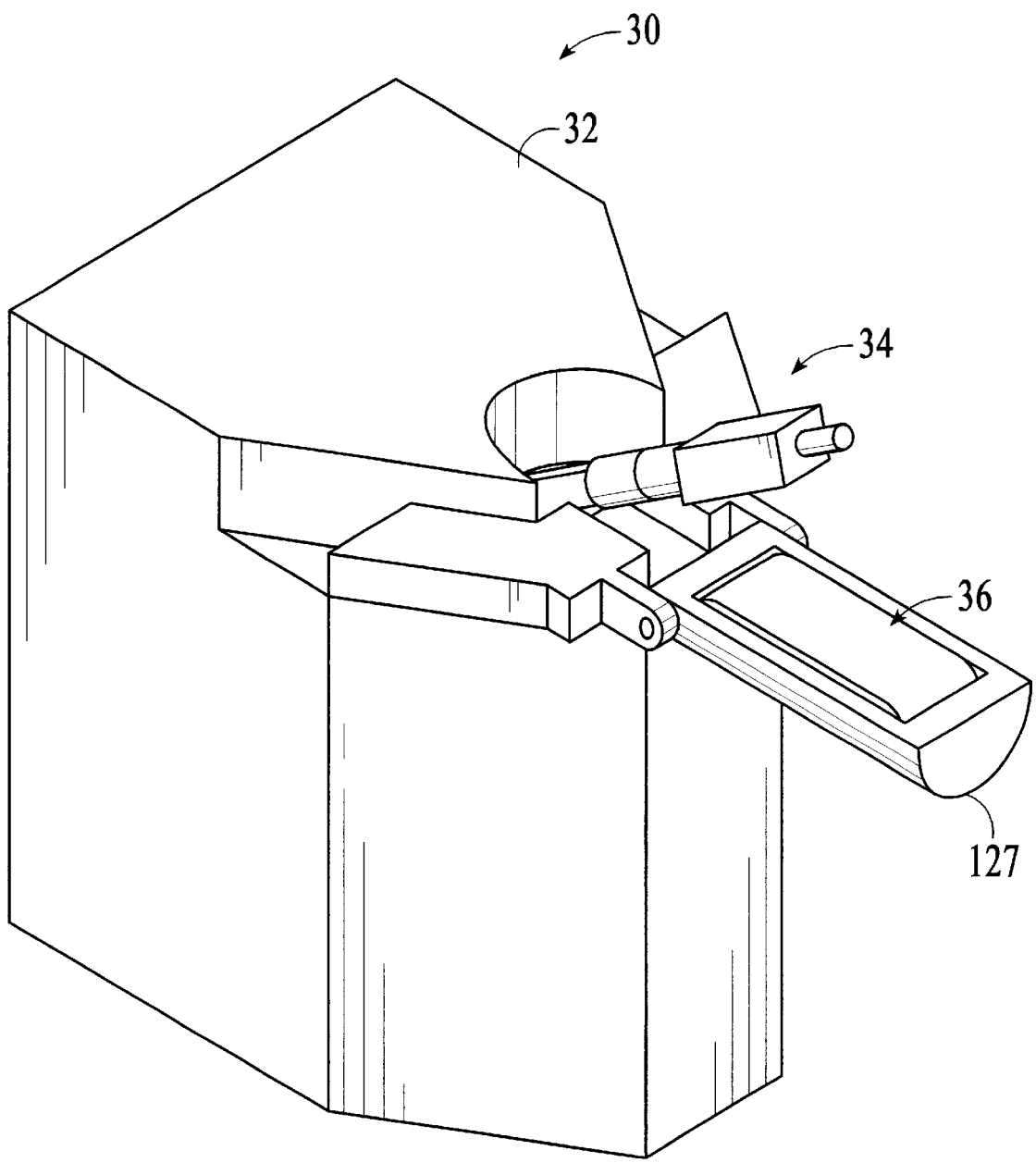
FIG. 3 is a view in perspective of the interface device of the vascular access training system of FIG. 1.

Interface device 30 enables a medical professional to simulate vascular access as illustrated in FIG. 3. Specifically, interface device 30 includes a catheter unit assembly 34, a skin traction mechanism 36 and a case 32. Catheter unit assembly 34 is disposed within case 32 and simulates the position of a catheter needle assembly that is manipulated by a medical professional during an actual vascular access procedure. Skin traction mechanism 36 is removably attached to an exterior surface of case 32 and simulates applying pressure and traction on a portion of a human anatomy, while performing a vascular access procedure. The medical professional manipulates the catheter needle assembly of catheter unit assembly 34 and skin traction mechanism 36 to simulate performance of a vascular access procedure.

Figure 4:
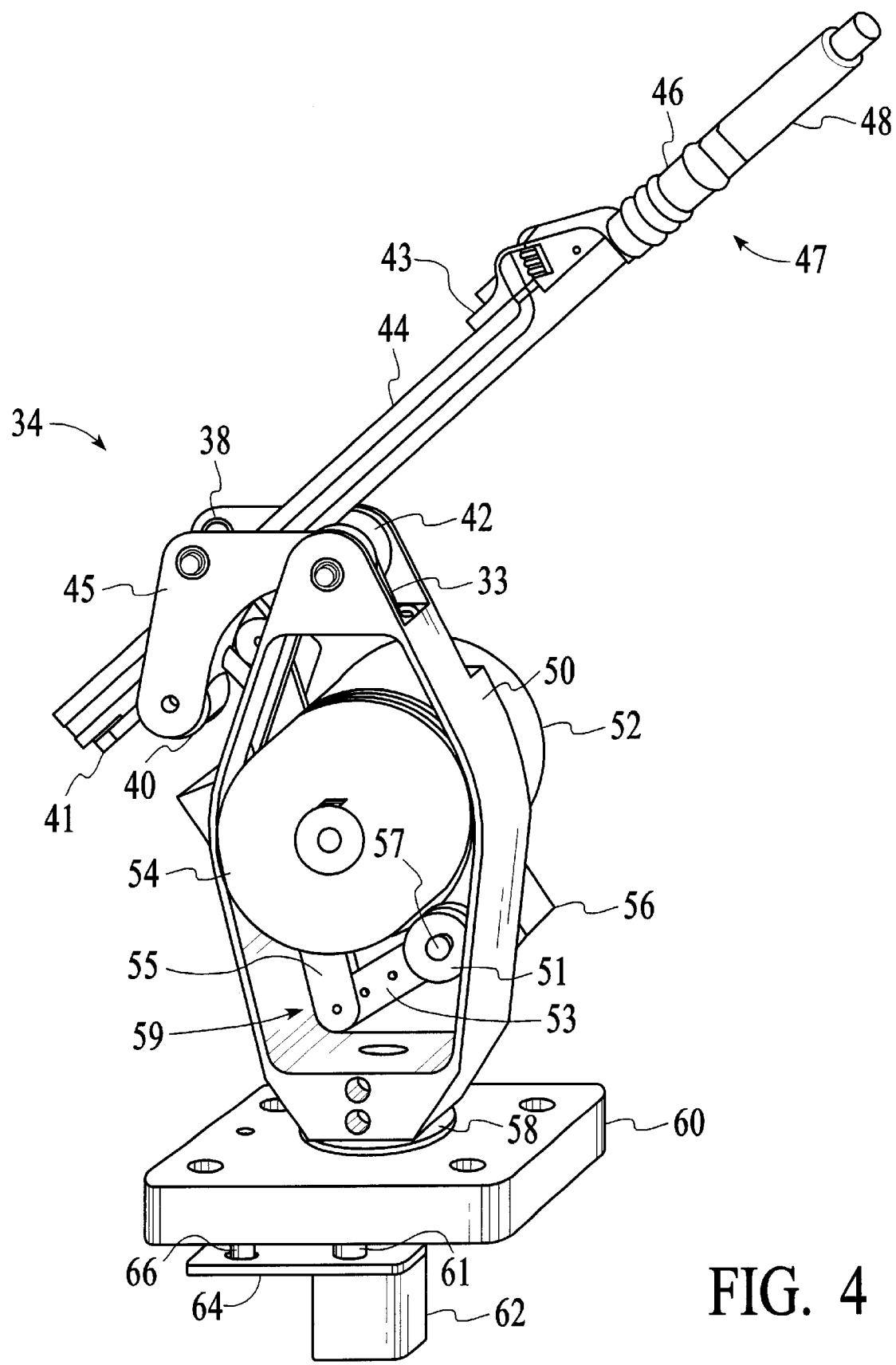
FIG. 4 is a side perspective view of a catheter unit assembly of the interface device of FIG. 3.
Figure 5A:
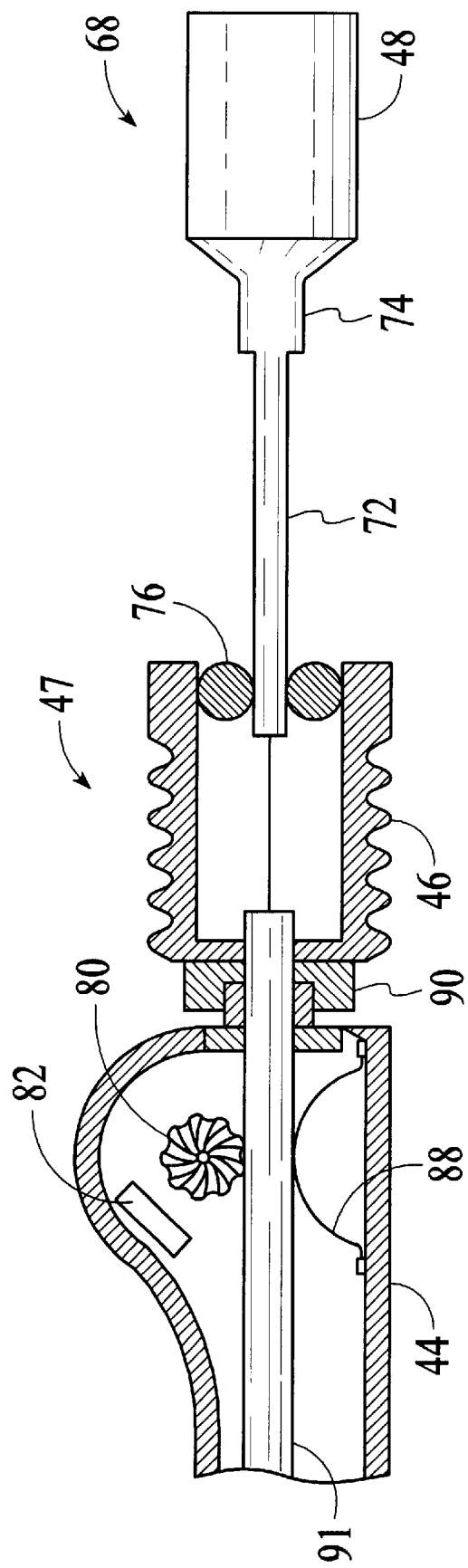
FIG. 5a is an exploded view in elevation and partial section of a catheter needle assembly inserted within the catheter unit assembly of FIG. 4.

Catheter unit assembly 34 for simulating catheter and needle positioning is illustrated in FIGS. 4 and 5a. Specifically, catheter unit assembly 34 includes a base 60, a housing 50 disposed on base 60, a bearing assembly 45 disposed on the housing, a catheter needle assembly 47 and a shaft 44 for receiving catheter needle assembly 47. The catheter needle assembly (FIG. 5a) is typically manipulated by medical professionals and includes needle assembly 68 and catheter hub 46. Needle assembly 68 includes a needle handle 48, needle shoulder 74 and needle shaft 72. The needle handle is disposed at the needle assembly proximal end with needle shoulder 74 positioned adjacent the needle handle. Needle shaft 72 extends from needle shoulder 74 toward the needle assembly distal end. Catheter hub 46 is coupled to shaft 44 with a catheter tube 91 extending into the shaft via a revolving bearing 90 to permit rotation of the catheter hub. The catheter hub includes cross-sectional dimensions greater than the cross-sectional dimensions of needle shaft 72 to receive the needle shaft in the catheter hub. The catheter hub further includes an O-ring 76 to serve as a stop or grip by engaging needle shoulder 74 as the needle shaft enters the catheter hub. An opening defined in catheter hub 46 adjacent revolving bearing 90 permits the needle shaft to be disposed through the catheter hub and extend into catheter tube 91 within shaft 44. The needle assembly is inserted into catheter hub 46 such that needle shaft 72 extends through revolving bearing 90 into catheter tube 91 within shaft 44. The needle shaft is secured against an etched bearing 80 within shaft 44 by a spring clip 88 (e.g., the catheter tube is sufficiently resilient to enable the spring clip to manipulate instruments within that tube), whereby the needle shaft contacts the etched bearing via an opening (not shown) in catheter tube 91. The etched bearing includes light and dark bands wherein the etched bearing rotates as needle shaft 72 is inserted or withdrawn from shaft 44. An optical encoder 82 is disposed adjacent etched bearing 80 to sense the bands and measure rotation of the etched bearing, thereby providing an indication of the translational motion of the needle shaft into and out of the catheter hub. The communications interface determines a pulse count of encoder 82 indicating translational motion of the needle shaft and transmits this information to computer system 25.

Figure 5B:
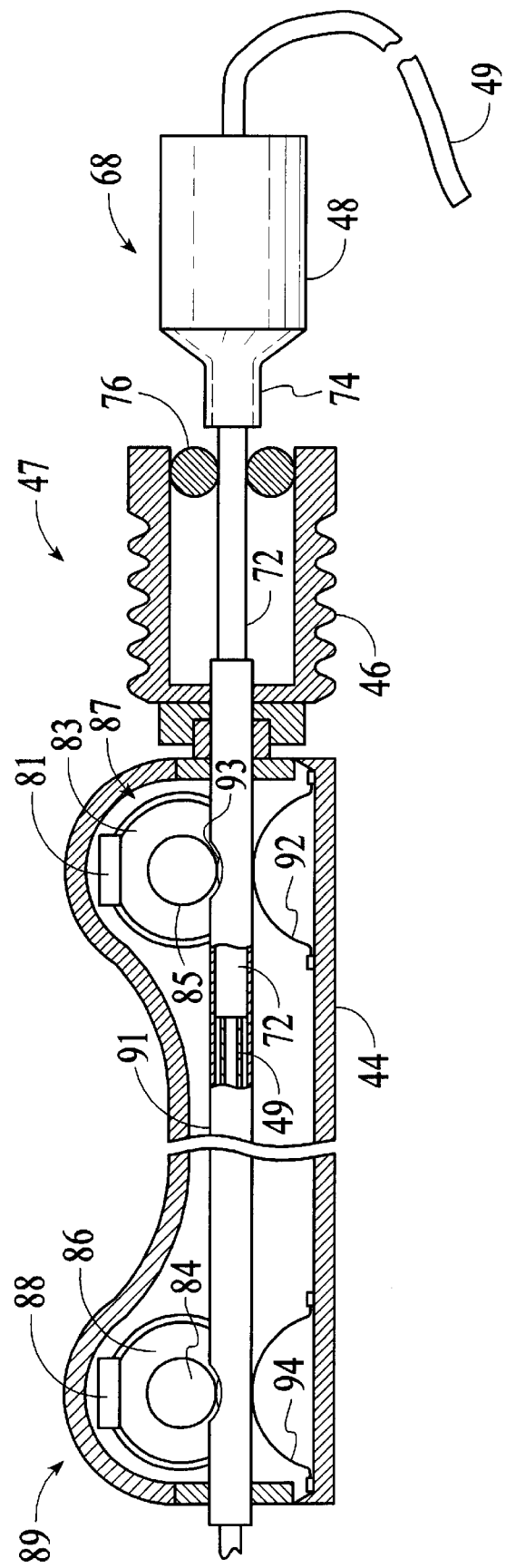

Alternatively, the catheter unit assembly may be configured to measure manipulation of coaxial devices, such as a wire or catheter inserted through a needle, as illustrated in FIG. 5b. The catheter unit assembly is substantially similar to the catheter unit assembly described above for FIG. 5a, except that a wire is disposed through the catheter needle assembly and shaft 44 includes an additional encoder to measure wire manipulation. Specifically, the catheter needle assembly is inserted into shaft 44 as described above, whereby encoder assembly 87 is disposed toward the shaft proximal end to measure translational motion of needle shaft 72. Encoder assembly 87 includes a friction wheel 85, encoder disk 83 and encoder sensor 81. Friction wheel 85 is disposed proximate catheter tube 91 and is coupled to encoder disk 83. Encoder disk 83 includes an alternating arrangement of reflective and non-reflective marks that are detected by encoder sensor 81 to measure encoder disk rotation. Encoder sensor 81 is preferably implemented by a reflective optical surface mount encoder, such as a Hewlett Packard HEDR-8000. Needle shaft 72 is pressed against friction wheel 85 within shaft 44 by a spring clip 92. The needle shaft contacts friction wheel 85 via an opening 93 defined in catheter tube 91. Translational motion of needle shaft 72 causes friction wheel 85 to rotate, thereby rotating encoder disk 83. Encoder sensor 81 measures encoder disk rotation, thereby providing an indication of needle shaft translational motion.

A wire 49 may be passed through needle assembly 68 and extend beyond the needle shaft distal end within catheter tube 91 toward the shaft distal end. An encoder assembly 89 is disposed toward the shaft distal end to measure translational motion of wire 49. Encoder assembly 89 is substantially similar to encoder assembly 87, and includes a friction wheel 84, encoder disk 86 and encoder sensor 88, each as described above for encoder assembly 87. The wire is pressed against friction wheel 84 within shaft 44 by a spring clip 94. The wire contacts friction wheel 84 via an opening 95 defined in catheter tube 91. Translational motion of wire 49 causes friction wheel 84 to rotate, thereby rotating encoder disk 86. Encoder sensor 88 measures encoder disk rotation, thereby providing an indication of wire translational motion.

Exemplary operation of the alternative configuration in relation to simulation of placement of a central venous catheter (CVC) is described. Specifically, needle shaft 72 is inserted into shaft 44, whereby the needle shaft translational motion is measured by encoder assembly 87 as described above. Wire 49 is subsequently inserted through needle assembly 68, whereby the wire translational motion is measured by encoder assembly 89 as described above. Needle assembly 68 is removed entirely from the interface device, and a suitably sized catheter (not shown, e.g., having the approximate dimensions of the needle shaft) is threaded over wire 49 and inserted through hub 46 and into catheter tube 91. Translational motion of the catheter and removal of needle assembly 68 are sensed by encoder assembly 87. Wire 49 is similarly removed to allow fluids to flow through the catheter, whereby translational motion and removal of the wire are sensed by encoder assembly 89. The encoder assembly measurements are provided to the computer system to update the simulation and display.

Referring back to FIG. 4, the catheter needle assembly is inserted into a proximal end of shaft 44 with catheter hub 46 rotatably coupled to that shaft. The distal end of shaft 44 is disposed through bearing assembly 45 to enable the shaft to be translated. Bearing assembly 45 includes bearings 38, 40, 42 arranged in a triangular fashion with bearing 38 disposed between bearings 40, 42. The distal end of shaft 44 is disposed through bearing assembly 45 such that the shaft rests upon bearings 40, 42 and is positioned between bearings 40, 42 and bearing 38. The bearings enable shaft 44, and hence, catheter needle assembly 47 to be translated toward and away from housing 50. Shaft 44 further includes stops 41, 43 respectively disposed toward the shaft distal and proximal ends. Stop 41 interfaces bearing 40, while stop 43 interfaces bearing 38 to restrict shaft translational motion in order to maintain the shaft within bearing assembly 45.

Bearing assembly 45 is rotatably attached to housing 50 and may be manipulated relative to housing 50 about an axis of rotation of bearing 42. The bearing assembly rotation enables catheter needle assembly 47 to be manipulated with various pitches (e.g., forward and backward), thereby enabling simulation of various angles of needle insertion into the simulated human anatomy. Housing 50 supports bearing 42, thereby coupling bearing assembly 45 to the housing. The housing is attached to base 60 via a bearing 58 to enable the housing, and hence, the catheter needle assembly to rotate relative to the base. The rotational motion of housing 50 provides simulation of needle insertion with various yaw positions. The various motions of the bearing assembly, housing and shaft enable the system to simulate three degrees of freedom (e.g., pitch, yaw and translation) of the catheter needle assembly.

The degrees of freedom of catheter needle assembly motion are measured via potentiometers and encoders. In particular, a pitch potentiometer 56 is attached to housing 50 and coupled to bearing assembly 45 via a coupling 59 disposed within the housing. Coupling 59 includes a longitudinal bar 55 and a transverse bar 53. Longitudinal bar 55 extends substantially along a longitudinal axis of housing 50 from bearing assembly 45, while transverse bar 53 extends substantially along a housing transverse axis from a distal end of longitudinal bar 55 to a coupling shaft 57. The distal end of transverse bar 53 is secured to shaft 57 via substantially annular disc 51. Potentiometer 56 is attached to coupling shaft 57 to measure rotation of that shaft, and hence, the pitch of catheter needle assembly 47. Basically, manipulation of bearing assembly 45 about an axis of rotation of bearing 42 causes longitudinal bar 55 to translate substantially along the housing longitudinal axis. The translational motion similarly causes the proximal end of transverse bar 53 to translate with longitudinal bar 55. The translational motion of the proximal end of transverse bar 53 enables the transverse bar distal end to rotate coupling shaft 57, whereby potentiometer 56 measures the coupling shaft rotation, thereby indicating the angle of pitch of shaft 44 (e.g., forward or backward angle). A yaw potentiometer 62 is disposed below and attached to base 60 via an arm 64 and a pin 66 connecting the arm to the base. A shaft 61 extends from yaw potentiometer 62 through base 60 to bearing 58 and housing 50, whereby the yaw potentiometer measures rotation of housing 50, and hence, yaw position of catheter needle assembly 47. The communications interface receives the signals from potentiometers 56, 62 indicating catheter needle assembly manipulation (e.g., pitch and yaw) and transmits the signals to computer system 25 for processing. A force feedback unit 54 is disposed within housing 50 to provide feedback force to the catheter needle assembly for a realistic simulation. The force feedback unit is coupled to shaft 44 via a tension member 33 to impede shaft motion based on control signals received from computer system 25 via communications interface 24. The communications interface may include digital to analog converters (DAC) to convert control signals from computer system 25 to analog signals to control the force feedback unit. A translation encoder 52 is attached to housing 50 and coupled to a shaft (not shown) of force feedback unit 54 to measure rotation of the force feedback unit shaft or translational motion of shaft 44. The communications interface determines an encoder pulse count indicating catheter needle assembly translational motion and transmits this information to computer system 25.

Figure 6:
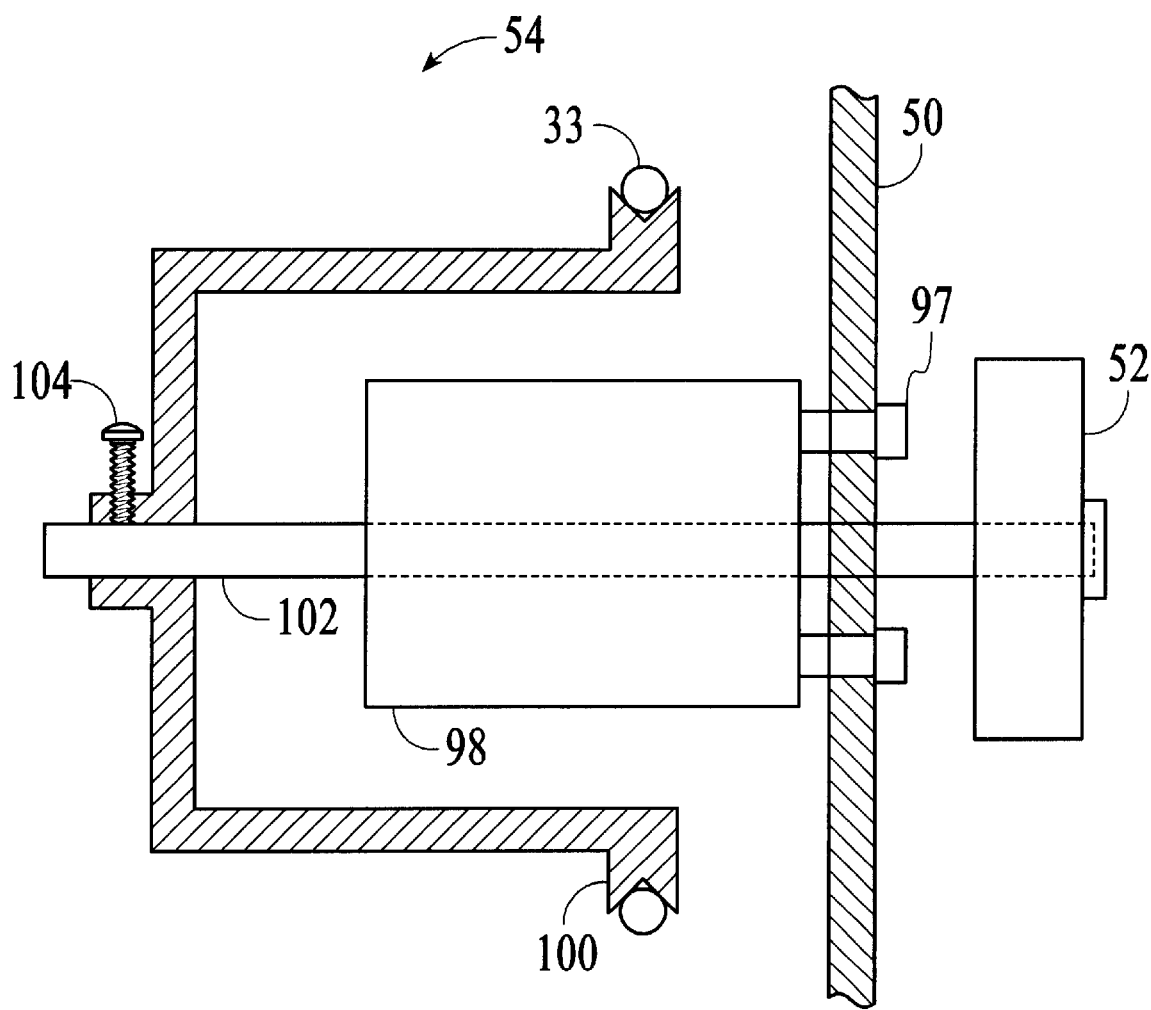
FIG. 6 is a side view in elevation and partial section of a force feedback unit of the catheter unit assembly of FIG. 4.

Force feedback unit 54 applies force to impede motion of shaft 44 and provide a realistic feel to catheter needle assembly 47 as illustrated in FIG. 6. Specifically, force feedback unit 54 includes a force feedback device 98, having a shaft 102, and an offset pulley 100. Force feedback device 98 may be implemented by an electromagnetic brake or electric motor or other force generating device and is typically partially disposed within offset pulley 100. Shaft 102 extends through force feedback device 98, whereby offset pulley 100 is attached to the shaft via a set screw 104. Force feedback device 98 is typically attached to housing 50 via fasteners 97, and applies force to shaft 102 to impede offset pulley rotation.

Tension member 33 is wound about offset pulley 100 with each tension member end respectively attached to the proximal and distal ends of shaft 44. In other words, tension member 33 extends from the distal end of shaft 44 (FIG. 4) over bearing 42 to offset pulley 100, whereby the tension member extends around the offset pulley and back over bearing 42 to the shaft proximal end. Thus, as shaft 44 translates, tension member 33 causes offset pulley 100 to rotate. Force feedback device 98 impedes offset pulley rotation, thereby requiring additional force to move shaft 44 and imparting a realistic feel to the simulation. A translation encoder 52 is disposed on housing 50 and connected to shaft 102 to measure rotation of that shaft and provide an indication of the translation motion of shaft 44 or catheter needle assembly.

Figure 7:
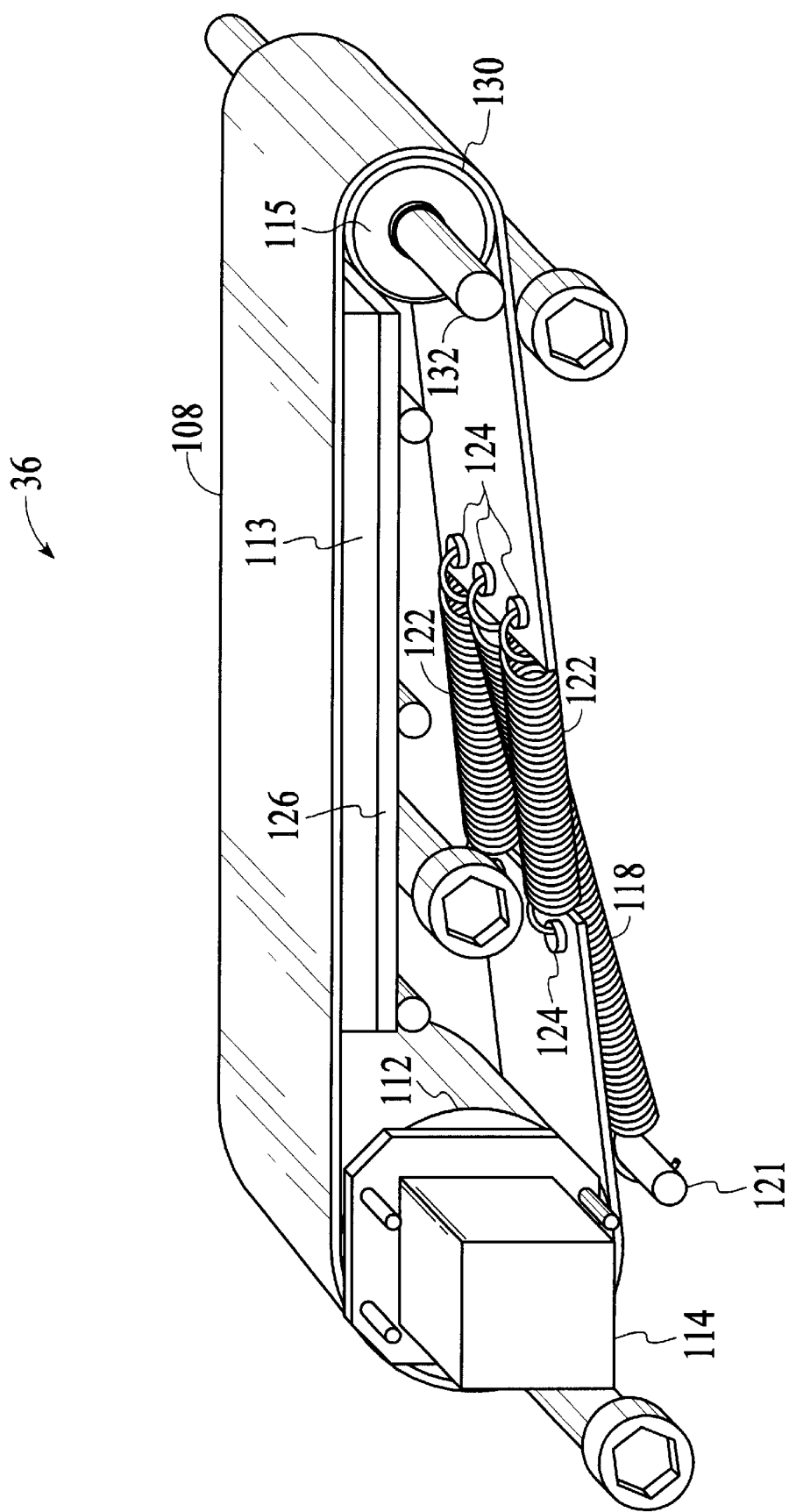
FIG. 7 is a side perspective view of a skin traction mechanism of the interface device of FIG. 3.

Skin traction mechanism 36 simulates preparing a human anatomy prior to commencing a vascular access procedure as illustrated in FIG. 7. Specifically, skin traction mechanism 36 includes a casing 127 (FIG. 3), belt pulleys 112, 115, a belt 108, belt tension springs 122, belt positioning spring 118 and a resilient backing 113. Belt pulleys 112, 115 are typically substantially cylindrical and are disposed at opposing ends of casing 127. Belt 108 is disposed about the belt pulleys and includes a length slightly less then the length of a path around the pulleys such that a slight gap exists between belt ends. The belt ends include grommets 124, whereby belt tensioning springs 122 are disposed within grommets of each belt end to securely fasten the belt about the pulleys. Belt positioning spring 118 is disposed within a belt grommet 124 and extends from that grommet to a support 121 within casing 127. The belt positioning spring moves the belt over belt pulleys 112, 115 in a direction opposing the belt positioning spring tension when forces are applied to the belt (e.g., when the belt is manipulated by a medical professional). Resilient backing 113 is disposed beneath belt 108 to enable simulation of skin resiliency. A two-surface bearing member 126 is disposed beneath resilient backing 113 to provide two smooth bearing surfaces to support pressure on belt 108 and enable low friction belt motion. A potentiometer 114 is connected to a shaft of belt pulley 112 to measure rotation of that belt pulley and provide an indication of belt motion to computer system 25 via communications interface 24. The skin traction mechanism further includes slots 130 and a pin 132 for connecting the mechanism to case 32 (FIG. 3) of the interface device. Thus, the skin traction mechanism provides the realistic feel of a human anatomical surface.

Operation of the vascular access training system is described with reference to FIGS. 1–7. Initially, the vascular access training system includes various modules, such as a vascular access module covering peripheral vascular access, whereby a medical professional selects a module corresponding to a desired simulation. The system executes the selected module and permits the medical professional to select a case study, while providing a case history for the selected case. A series of videos and other training elements are presented to the medical professional, whereby the medical professional interacts with the system via keyboard and mouse to answer inquiries and/or make selections. Subsequent to training, the vascular access procedure is simulated by manipulation of interface device 30, whereby the system simulates the anatomy corresponding to the selected case. For example, if the procedure includes catheterization of the back of a hand, a hand is displayed on monitor 28 (e.g., as illustrated in FIG. 2). The simulated hand is modified by the system based on manipulation of skin traction mechanism 36 and catheter unit assembly 34.

During an actual procedure, the skin is typically retracted to facilitate locating veins. Skin traction mechanism 36 simulates this procedure wherein the medical professional typically applies force to belt 108 (e.g., with a thumb) similar to the manner in which such force is applied to the skin of a patient. The force applied to belt 108 deforms resilient backing 113 in a manner similar to deforming the skin of a patient. The belt is typically manipulated away from the interface device toward the medical professional to simulate the feel of placing the skin of a patient in traction. As force is applied to the belt, belt positioning spring 118 provides a resistive force that is felt by the medical professional. The belt motion causes belt pulleys 112, 115 to rotate wherein rotation of belt pulley 112 is measured by potentiometer 114. The potentiometer sends a signal to computer system 25, via communications interface 24, indicating the belt motion. Computer system 25 processes the signal and depicts deformation of the simulated skin under traction in a manner similar to that of a real patient. In other words, the simulation system shows visually on monitor 28 the simulated skin being placed in traction and the simulated vein under the skin appears stretched for easier access with the simulated needle.

Once the simulated skin is in traction, the medical professional utilizes mouse 22 to position a virtual needle above a vein. The catheter needle assembly is manipulated in various degrees of freedom (e.g., pitch, yaw, translation) to place the needle within the simulated patient. The system measures each degree of freedom to alter the display based on the manipulation. Specifically, translational motion of catheter needle assembly 47 causes shaft 44 to translate. The translational motion of shaft 44 enables tension member 33 to rotate offset pulley 100. Encoder 52 measures the rotation of offset pulley 100 and the encoder provides a signal to computer system 25, via communications interface 24, indicating needle translational motion.

Manipulation of catheter needle assembly 47 to vary pitch causes longitudinal and transverse bars 53, 55 to rotate coupling shaft 57 as described above. The coupling shaft rotation is measured by potentiometer 56 that provides a signal to computer system 25, via communications interface 24, indicating pitch of the needle. Further, manipulation of the catheter needle assembly to vary yaw causes housing 50 to rotate on bearing 58 as described above. Potentiometer 62 measures this rotation and provides a signal to computer system 25, via communications interface 24, indicating yaw of the needle. As the medical professional manipulates the needle to an appropriate position and angle, the manipulation degrees of freedom are measured to enable computer system 25 to adjust the display on monitor 28.

When the needle is manipulated to a desired position as viewed on monitor 28, the medical professional pushes the needle into the catheter unit assembly. The display shows the needle approaching and dimpling the skin based on the needle manipulation as measured by the encoders and potentiometers described above. The system senses the needle breaking the skin of the simulated patient and controls force feedback device 98 to provide force feedback to the medical professional by impeding rotation of offset pulley 100 as described above. When various errors are committed during the simulated procedure, such as going through the vein, the system simulates hematoma or provides various pain-like sounds. The simulation further provides appropriate behavior to the medical practitioner, such as flashback, that is visible in a transparent handle of the needle assembly shown on the display.

It will be appreciated that the embodiments described above and illustrated in the drawings represent only a few of the many ways of implementing an interface device and method for interfacing instruments to vascular access simulation systems.

The potentiometers and encoders may each be implemented by any conventional encoders or potentiometers, such as optical encoders, linear encoders or transducers, or potentiometers. For example, a linear set of light and dark lines may be disposed on shaft 44, whereby an encoder may be used to sense motion of the shaft with a linear target. The force feedback unit may be implemented by a mechanical brake, electromagnetic brake, electric motor or other actuator, and may impede or enhance pulley rotation to respectively require additional or less force to manipulate an instrument. Further, additional force feedback units may be employed to impede or enhance rotational motion of the catheter needle assembly, and to provide rotational and translational force feedback to additional instruments (e.g., wire, catheter, etc.) utilized in a simulation. Moreover, the rotational element of the force feedback unit may be implemented by a linear element, such as a linear magnetic drive or a rack and pinion drive. In addition, frictional braking may be directly applied to shaft 44 to impede shaft motion.

The skin traction mechanism may utilize a touch pad (e.g., computer touch pad) to provide motion in two dimensions to permit both direction and magnitude of the stretch to be measured. Further, a force stick, such as those manufactured by IBM, may be utilized by the skin traction mechanism to provide two dimensional skin traction. Moreover, a flexible model covered with a flexible fabric interwoven with fiber optic cables may be utilized to implement the skin traction mechanism. The flexible fiber optic cables change light transmission characteristics with stretch, thereby enabling determination of skin traction of a forearm, hand or other anatomical element. In addition, the skin traction mechanism may be configured to stretch or provide motion in any, or in any quantity of, directions or dimensions.

The interface device may include additional sensing devices at various locations on and/or within the interface device to sense touching or applying pressure to the anatomical element (e.g., to stop blood flow as the device attached to the end of the catheter hub is changed). These pressure devices may be implemented by various pressure pads, such as those utilizing piezo-electric techniques or flexible fabric. Further, the interface device may measure and apply force feedback in any, or in any quantity of, degrees of freedom for enhanced simulation. For example, the interface device may further permit and measure rotation of the catheter needle assembly for enhanced simulation.

The interface device of the present invention may be utilized with various elongated or other instruments (e.g., needles, catheters, wires, sheaths, etc.) for simulating a variety of medical procedures, and is not limited to the specific instruments or applications disclosed herein. The simulation system may simulate any anatomical sites and/or any types of blood vessels (e.g., veins, arteries, etc.) for performing simulated procedures. Further, the interface device may be utilized with actual instruments to permit medical practitioners to train with instruments used during medical procedures. The computer system of the simulation system may be implemented by any conventional or other processing system. The communications interface may include any circuitry (e.g., analog to digital converters, digital to analog converters, etc.) and/or processors to transfer and/or convert signals for compatibility between an interface device and processing system. The functions of the communications interface may further be performed within the interface device or processing system.

The various encoders, potentiometers, pulleys, belts and other components of the present invention may be implemented by any conventional or other types of components performing the above-described functions. The components may be of any shape or size, may be constructed of any suitable materials, and may be arranged in any fashion within the interface device. The belt and tension member may be constructed of any suitable material, and may be implemented by any belt, cable, rope, chain or other suitable device. The belt and tension member may be disposed in any fashion within the interface device. The pulleys may be implemented by any type of pulley, gear or other device, while the bearings may be implemented by any type of conventional bearing, roller or other device enabling shaft motion. The housings or casings and components of the interface device, catheter unit assembly and traction mechanism may be of any size or shape, and may be constructed of any suitable materials. The set screw utilized in the present invention may be implemented by any conventional set screw or any other conventional securing device.

It is to be understood that the terms "upper", "lower", "top", "bottom", "side", "length", "up", "down", "front", "rear", and "back"are used herein merely to describe points of reference and do not limit the present invention to any specific configuration or orientation.

From the foregoing description, it will be appreciated that the invention makes available a novel interface device and method for interfacing instruments to vascular access simulation systems wherein various instruments are interfaced to a vascular access simulation system to simulate performance of a variety of vascular access procedures.

Having described preferred embodiments of a new and improved interface device and method for interfacing instruments to vascular access simulation systems, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. Interface apparatus for interfacing peripherals corresponding to medical instruments to a simulation system thereby permitting a user to interact with the simulation system to perform a medical procedure on a simulated anatomy of a virtual patient, said interface apparatus comprising:

a site manipulation mechanism, selectively manipulable by the user and corresponding to an anatomical site of said virtual patient, providing information associated with manipulation of said site manipulation mechanism for transmission by the interface apparatus to the simulation system permitting the simulation system to update a simulated medical procedure in accordance with said mechanism manipulation.

2. The apparatus of claim 1 wherein said mock skin surface includes a compliant material that simulates skin resiliency.

3. The apparatus of claim 1 wherein said at least one sensor detects manual pressure applied to said mock skin surface by said user and provides information associated with said pressure detection to said simulation system.

4. The apparatus of claim 3 wherein said pressure detection information is utilized by said simulation system to simulate manual pressure applied to said simulated anatomy of said virtual patient.

5. An interface apparatus for interfacing peripherals corresponding to instruments to a simulation system thereby permitting a user to interact with the simulation system to perform a procedure in a virtual environment, said interface apparatus comprising:

a sensing assembly facilitating and measuring manipulation of a peripheral in a plurality of degrees of freedom and transmitting information associated with said measured manipulation to the simulation system permitting the simulation system to update a simulated procedure in accordance with said measured manipulation;

wherein said sensing assembly includes a configuration wherein axes of at least two of said degrees of freedom intersect and at least one axis of another of said degrees of freedom is offset from said intersection.

6. The apparatus of claim 5 wherein said at least two degrees of freedom are rotational and said at least one degree of freedom is linear.

7. The apparatus of claim 6 wherein said at least two degrees of freedom include peripheral pitch and yaw motion, and said at least one degree of freedom includes peripheral translational motion.

8. An interface apparatus for interfacing peripherals corresponding to medical instruments to a simulation system thereby permitting a user to interact with the simulation system to perform a medical procedure on a simulated anatomy of a virtual patient, said interface apparatus comprising:

a first peripheral selectively manipulable by the user and corresponding to a portion of a medical instrument, said peripheral providing information associated with said manipulation to the simulation system permitting the simulation system to update a simulated medical procedure in accordance with said manipulation; and a second peripheral selectively manipulable by the user and nested within said first peripheral, said second peripheral corresponding to a portion of a medical instrument and providing information associated with said second peripheral manipulation to the simulation system permitting the simulation system to update the simulated medical procedure in accordance with said second peripheral manipulation;

wherein said second peripheral is selectively translated by the user along a coaxial degree of freedom with respect to said first peripheral and is entirely removable from said first peripheral when fully retracted by the user.

9. The apparatus of claim 8 further including:

a force feedback unit to apply force to said first peripheral in response to control signals from the simulation system to simulate forces encountered by said corresponding medical instrument contacting the simulated anatomy during the medical procedure.

10. The apparatus of claim 8 wherein said medical procedure is a vascular access procedure.

11. The apparatus of claim 8 wherein said first peripheral corresponds to a needle portion of a medical instrument.

12. The apparatus of claim 8 wherein said second peripheral corresponds to a flexible catheter portion of a medical instrument.

13. The apparatus of claim 8 further including a sensing assembly, said sensing assembly including:

a pulley;

a tension member extending from a proximal end of a shaft receiving said first peripheral about said pulley to a shaft distal end, wherein said pulley and tension member are manipulated in response to said first peripheral translational motion; and a translation sensor disposed proximate said pulley to measure pulley rotation due to translational manipulation of said first peripheral and providing information associated with said first peripheral translational motion to the simulation system.

14. The apparatus of claim 13 further including a force feedback unit including a force applicator to control rotation of said pulley and apply force to said first peripheral in response to control signals from the simulation system.

15. The apparatus of claim 13 wherein said sensing assembly includes a configuration having an axis of peripheral translational motion displaced from said pulley to thereby facilitate manipulation of said peripheral about a peripheral pitch axis independent of a force feedback unit position.

16. The apparatus of claim 13 wherein said sensing assembly includes a configuration having an axis of peripheral translational motion displaced from an intersection of peripheral pitch and yaw axes.

17. The apparatus of claim 8 further including a first translational sensor for measuring manipulation of said first peripheral relative to a shaft receiving said first peripheral and providing information associated with said first peripheral manipulation to the simulation system permitting the simulation system to update the simulated medical procedure in accordance with said first peripheral manipulation.

18. The apparatus of claim 17 further including a second translational sensor for measuring manipulation of said second peripheral relative to said first peripheral and providing information associated with said measured manipulation of said second peripheral to the simulation system to update the simulated medical procedure in accordance with said second peripheral manipulation.

19. The apparatus of claim 8 further including:

peripheral sensing means for measuring manipulation and detecting insertion and removal of each peripheral within the simulated anatomy and providing information associated with said peripheral manipulation, insertion and removal to the simulation system permitting the simulation system to simulate performance of the medical procedure with said corresponding medical instruments and exchange of said corresponding medical instruments during the medical procedure in accordance with said manipulation, insertion and removal of said peripherals.

20. A method permitting a user to interact with a simulation system via an interface to perform a medical procedure on a simulated anatomy of a virtual patient, said method comprising the steps of:

(a) operatively interconnecting a first peripheral to the interface, wherein said first peripheral is selectively manipulable by the user and corresponds to a portion of a medical instrument;

(b) operatively interconnecting a second peripheral corresponding to a portion of a medical instrument to the interface, wherein said second peripheral is selectively manipulable by the user and is nested within said first peripheral, and wherein said second peripheral is selectively translated by the user along a coaxial degree of freedom with respect to said first peripheral and is entirely removable from said first peripheral when fully retracted by the user;

(c) measuring manipulation of each peripheral within the simulated anatomy via the interface; and (d) transmitting information associated with the manipulation of each peripheral from the interface to the simulation system permitting the simulation system to update a simulated medical procedure in accordance with the manipulation of said first and second peripherals.

21. The method of claim 20 wherein the interface includes a force feedback unit to apply force to said first peripheral, and said method further includes the step of:

(e) applying force feedback, via the force feedback unit, to said first peripheral in response to control signals from the simulation system to simulate forces encountered by the corresponding medical instrument contacting the simulated anatomy during the medical procedure.

22. The method of claim 20 wherein the interface further includes a pulley and a tension member coupled to a shaft receiving said first peripheral and extending about the pulley, wherein the pulley and tension member are manipulated in response to first peripheral translational motion, and step (c) further includes:

(c.1) measuring pulley rotation due to translational manipulation of said first peripheral;

step (d) further includes:

(d.1) transmitting information associated with said translational manipulation of said first peripheral from the interface to the simulation system.

23. The method of claim 22 wherein step (d) further includes:

(d.2) controlling rotation of the pulley to apply force to said first peripheral in response to control signals from the simulation system.

24. The method of claim 22 wherein step (a) further includes:

(a.1) operatively interconnecting said first peripheral to the interface by displacing a peripheral pitch axis from the pulley to thereby facilitate manipulation of said peripheral about the pitch axis independent of a force feedback unit position.

25. The method of claim 22 wherein step (a) further includes:
(a.1) operatively interconnecting said first peripheral to the interface by displacing an axis of peripheral translational motion from an intersection of peripheral pitch and yaw axes.

26. The method of claim 20 wherein step (c) further includes:
(c.1) measuring manipulation of said first peripheral relative to a shaft receiving said first peripheral; and
step (d) further includes:
(d.1) transmitting information associated with said measured first peripheral manipulation from the interface to the simulation system permitting the simulation system to update the simulated medical procedure in accordance with the manipulation of said first peripheral.

27. The method of claim 26 step (c) further includes:
(c.2) measuring manipulation of said second peripheral relative to said first peripheral; and
step (d) further includes:
(d.2) transmitting information associated with the measured manipulation of said second peripheral to the simulation system permitting the simulation system to update the simulated medical procedure in accordance with the manipulation of said second peripheral.

28. The method of claim 20 wherein step (c) further includes:
(c.1) measuring manipulation and detecting insertion and removal of each peripheral within the simulated anatomy; and
step (d) further includes:
(d.1) transmitting information associated with the peripheral manipulation, insertion and removal to the simulation system permitting the simulation system to simulate performance of the medical procedure with the corresponding medical instruments and exchange of the corresponding medical instruments during the medical procedure in accordance with the peripheral manipulation, insertion and removal.

29. A method permitting a user to interact with a simulation system via an interface to perform a medical procedure on a simulated anatomy of a virtual patient, said method comprising the steps of:
(a) operatively interconnecting a site manipulation mechanism to the interface, wherein said site manipulation mechanism is selectively manipulable by the user and corresponds to an anatomical site of the virtual patient;
(b) measuring manipulation of said site manipulation mechanism via the interface, wherein the measured manipulation of said site manipulation mechanism provides information associated with manipulation of the anatomical site; and
(c) transmitting the manipulation measurement for said site manipulation mechanism from the interface to the simulation system permitting the simulation system to update a simulated medical procedure in accordance with the measured mechanism manipulation.

30. The method of claim 29 wherein step (b) further includes:
(b.1) measuring manual pressure applied to said mock skin surface by said user via said at least one sensor.

31. The method of claim 30 wherein step (c) further includes:
(c.1) transmitting said manual pressure measurement for said mock skin surface from the interface to the simulation system permitting the simulation system to simulate manual pressure applied to said simulated anatomy of said virtual patient.

32. A method permitting a user to interact with a simulation system via an interface to perform a procedure within a virtual environment, wherein the interface includes a sensing assembly to facilitate and measure manipulation of a peripheral corresponding to an instrument in a plurality of degrees of freedom, said method comprising the steps of:
(a) displacing an axis of at least one of said degrees of freedom from an intersection of axes of at least two others of said degrees of freedom;
(b) measuring manipulation of said peripheral via the interface; and
(c) transmitting the manipulation measurement for said peripheral from the interface to the simulation system permitting the simulation system to update a simulated procedure in accordance with the measured peripheral manipulation.

33. The method of claim 32 wherein said at least two degrees of freedom are rotational and said at least one degree of freedom is linear.

34. The method of claim 32 wherein said at least two degrees of freedom include peripheral pitch and yaw motion, and said at least one degree of freedom includes peripheral translational motion.

* * * * *